(12) United States Patent
Serimian

(10) Patent No.: US 9,167,738 B1
(45) Date of Patent: Oct. 27, 2015

(54) ROTARY CULTIVATOR

(75) Inventor: Jerry C. Serimian, Kingsburg, CA (US)

(73) Assignee: The United States of America, as represented by the Secretary of Agriculture, Washington, DC (US)

( * ) Notice: Subject to any disclaimer, the term of this patent is extended or adjusted under 35 U.S.C. 154(b) by 1309 days.

(21) Appl. No.: 12/507,328

(22) Filed: Jul. 22, 2009

(51) Int. Cl.
*A01B 33/06* (2006.01)

(52) U.S. Cl.
CPC ...................................... *A01B 33/06* (2013.01)

(58) Field of Classification Search
USPC ......... 172/30, 38, 81, 96, 110, 111, 121, 233, 172/261, 522, 612, 189, 705, 707, 25, 27, 172/28, 35, 682, 45, 169, 264, 540, 543; 56/16.9; 404/120
See application file for complete search history.

(56) References Cited

U.S. PATENT DOCUMENTS

| | | | | |
|---|---|---|---|---|
| 1,102,979 A * | 7/1914 | Connor | ......................... | 172/543 |
| 2,196,636 A * | 4/1940 | Longman | ....................... | 172/522 |
| 2,364,667 A * | 12/1944 | Seaman | .......................... | 172/543 |
| 2,388,689 A * | 11/1945 | Hebert | ........................... | 172/522 |
| 2,389,976 A * | 11/1945 | Hebert | ........................... | 172/349 |
| 3,117,632 A * | 1/1964 | Caggiano, Jr. | ...................... | 172/5 |
| 3,126,656 A * | 3/1964 | Blackwell, Jr. | ................. | 37/189 |
| 4,034,814 A * | 7/1977 | van der Lely | ................. | 172/49.5 |
| 4,055,221 A * | 10/1977 | van der Lely | ................. | 172/49.5 |
| 4,114,697 A * | 9/1978 | Carlucci | ........................ | 172/543 |
| 4,332,299 A * | 6/1982 | Parks et al. | ..................... | 172/98 |
| 4,384,618 A | 5/1983 | Williams | | |
| 4,466,490 A | 8/1984 | Eckels | | |
| 4,505,096 A * | 3/1985 | Brown | .......................... | 56/328.1 |
| 4,567,689 A | 2/1986 | Lemons | | |
| 4,782,654 A * | 11/1988 | Bezzerides | ...................... | 56/370 |
| 5,050,372 A * | 9/1991 | Heiskell | .......................... | 56/12.7 |
| 5,287,932 A * | 2/1994 | Fleck | ................................ | 172/96 |
| 6,056,067 A * | 5/2000 | Brown | ........................... | 172/111 |
| 7,690,177 B2 * | 4/2010 | Spitzley | ......................... | 56/14.9 |

OTHER PUBLICATIONS

Weed Badger® Precision in-the-row tillers and mowers, www.weedbadger.com.

* cited by examiner

*Primary Examiner* — Matthew D Troutman
(74) *Attorney, Agent, or Firm* — Robert D. Jones; John D. Fado; Lesley Shaw

(57) ABSTRACT

The rotary cultivator enables an operator to cultivate an area immediately adjacent to (for example) perennial plants. The cultivator is a tractor-mounted tool with an articulated boom. A rotary cultivator head is disposed at a distal end of the boom so that a tractor operator can manipulate the boom and attached cultivator head through a full range of motions. The cultivator head includes a rotary disk with two essentially identical blade assemblies. Each blade assembly has a short blade that rotates within the periphery of the disk, and a long blade that extends beyond the periphery of the disk. The long blade has an extended segment that is flexible and elastic so that when the long blade extended segment contacts the stalk/trunk of a perennial plant, the extended segment elastically deforms so that the stalk/trunk is not damaged.

17 Claims, 3 Drawing Sheets

ROTARY CULTIVATOR

FIELD OF THE INVENTION

The present invention relates to a system for agricultural weeding and cultivating. Specifically, the invention relates to a cultivating system comprising flexible blades that enable a technician to cultivate around (for example) the trunk of a grape vine without damaging the plant.

BACKGROUND OF THE INVENTION

Perennial crops (such as grapes) are negatively impacted by the presence and growth of weeds in the areas surrounding and adjacent to the crops. Similar concerns also apply to immature trees, shrubs, and many crops grown on lattice works, and various other types of scaffolding. Crops that fall into these categories frequently have trunks/stalks that are relatively substantial and robust, but are more vulnerable than the trunks of mature trees.

These types of crops are frequently grown in widely spaced rows and may produce products (such as fruits) that are in relatively close proximity to the ground. Weeds around the crops compete with the crops for light, moisture, and soil nutrients. The weeds may also bring undesirable insects and diseases, and interfere with workers' ability to care for and maintain the crops. Weeds also obstruct harvesting machinery and add time and expense to the harvesting process.

Herbicides are frequently used to control the weeds around perennial crops however, even if the herbicides do not directly damage the crops, the plants may absorb some or all of the herbicide chemicals and express the chemicals in their fruits and other products. Over-spraying and spray drift may cause the herbicides to be deposited directly on the fruits/products. Further, the use of herbicides and other chemical sprays always evokes concerns regarding the unintended effects of the sprays on the local ground and surface water as well as the flora and fauna in the environment associated with the affected fields. Additionally, there is a general market preference (and an associated higher price) for products grown "organically" without the use of chemical sprays.

Weeds can be removed manually by a worker on foot using a mechanized or non-mechanized tool. Although these methods are relatively simple and in some respects inexpensive, they are also slow, inefficient, and increase labor costs. Most hand-carried tools are limited to cutting the weeds on the surface and lack the practical ability to cultivate large areas in a relatively short period of time.

More powerful tractor-mounted tools are also used to remove weeds around perennial crops. Although traditional brush-hog type mowers can quickly cut the weeds, working in close proximity to the trunks/stalks of the crops can be a slow process and any operator error may result in the loss of a valuable plant. Additionally, some areas immediately adjacent to the crops simply cannot be addressed by this process and the mowers are not capable of actually penetrating the ground and cultivating the soil.

Recently, new and powerful tractor-mounted cultivator systems have become available to cultivate the areas around the crops. These cultivator systems commonly use an array of mechanical and electrically-based sensors to prevent the cultivating mechanism from contacting the selected plant. However, these systems are generally complex and prone to problems in a field environment. Further, the systems require support and integration equipment that significantly increases the size and weight, and technical complexity of the overall device so that the systems cannot be used on small tractors.

The need exists for a simple and efficient cultivating system that allows a tractor-mounted device to operate in close proximity to targeted plants such as perennial crops, shrubs, and immature trees without damaging the targeted plants. The current invention comprises a system compatible with relatively small and simple farm tractors that enables an operator to quickly and efficiently cultivate the area immediately adjacent to the targeted plants.

SUMMARY OF THE INVENTION

The current invention is directed to a rotary cultivating device. The device comprises a rotary base with at least one long blade attached to the rotary base. The long blade has a non-cultivating edge disposed adjacent the rotary base, and a cultivating edge projecting away from the rotary base.

The long blade comprises a base segment that is attached to the rotary base so that the long blade base segment is effectively rigid and non-elastic. A mid segment is attached to the long blade base segment. The long blade mid segment extends to the periphery of the rotary base. A long blade extended segment is attached to an end of the mid segment. The extended extends beyond the periphery of the rotary base.

In operation, as the base rotates the long blade, the long blade cultivating edge penetrates and cultivates the soil surface. When the long blade extended segment contacts a fixed object projecting from the soil, the long blade extended segment elastically deforms, thereby limiting the amount of force imparted from the long blade extended segment to the object.

The current invention is also directed to a rotary disk cultivating head comprising a plurality of blade assemblies. Each blade assembly includes a center member that extends normal to the disk. The center member has a proximal side facing the center of the disk, and a distal side facing the periphery of the disk. A short blade is attached to the distal side of the center member. The short blade extends to the periphery of the disk. A long blade is attached to proximal side of the center member. The long blade has an elastic extended segment that extends beyond the periphery of the disk.

In operation, as the disk rotates the blade assembly, the blade assembly cultivates the surface of the soil so that when the long blade extended segment contacts a fixed object projecting from the soil, the long blade extended segment elastically deforms, thereby limiting the amount of force imparted from the long blade extended segment to the object.

The current invention is also directed to a method of making a rotary cultivating device. A rotary base is provided and a center member is attached to the rotary base. The center member has a proximal side facing the center of the base, and a distal side facing the periphery of the base. A short blade is connected to the distal side of the center member. The short blade is extended to the periphery of the base. An elastic long blade is attached to the proximal side of the center member. An extended segment of the long blade extends beyond the periphery of the base. At least one bend is created in the long blade so that the long blade bends away from the center member. The long blade extended segment flexes in the direction of the periphery of the disk when the long blade extended segment contacts a fixed object.

DETAILED DESCRIPTION OF PREFERRED EMBODIMENTS

The current invention comprises a cultivator device 10 for weeding/cultivating the area adjacent (for example) perennial crops and immature trees. In the preferred embodiment, the rotary cultivator device 10, comprises a hydraulic pump 12 connected to the power take-off of a conventional farm tractor T. The pump 12 and associated hydraulic components are manipulated by mechanical controls accessible to the tractor T operator.

Figure 1:
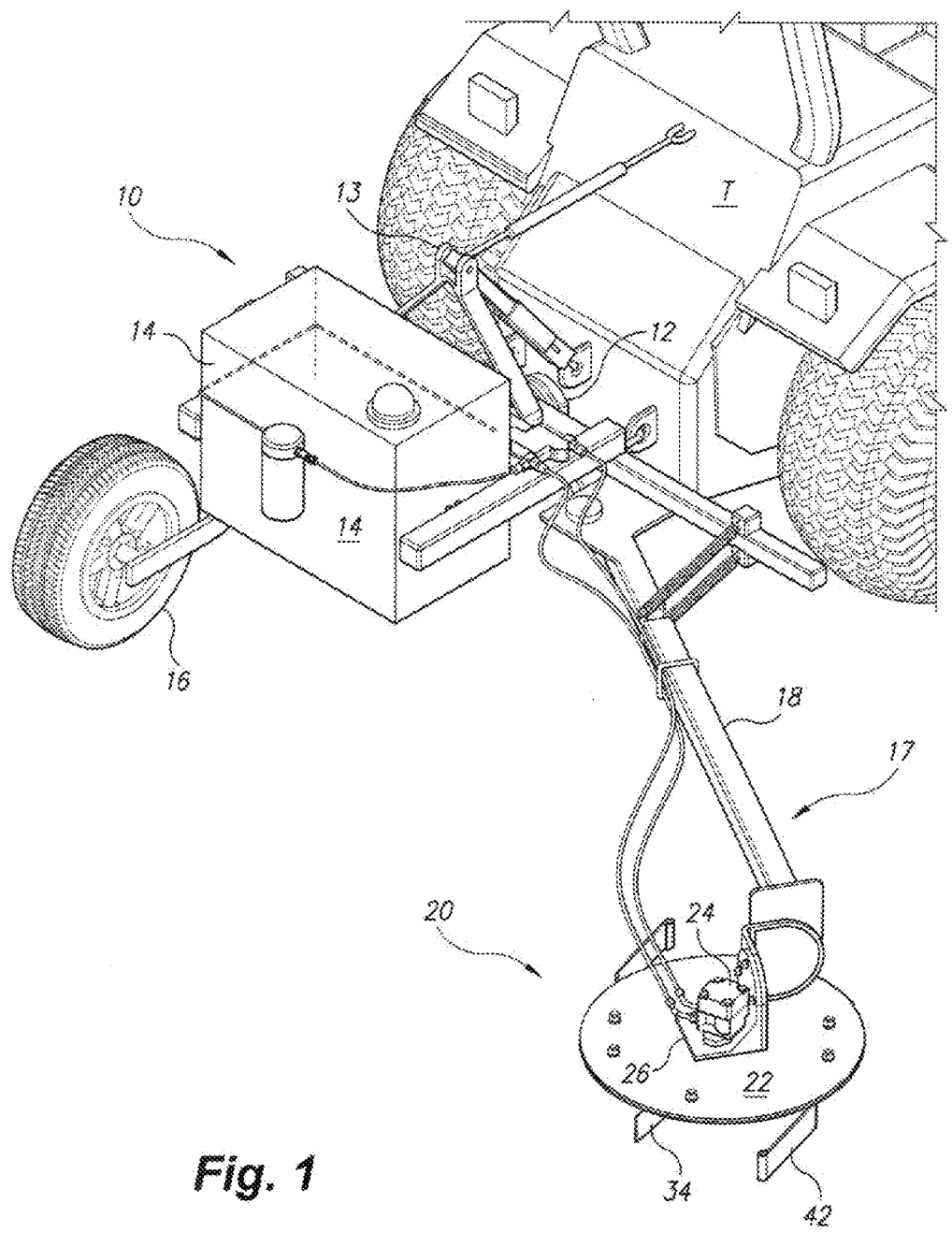
FIG. 1 is a perspective view of the current invention.

As shown in FIG. 1, the tractor T is connected with a frame 13 of the device 10 by a conventional three point hitch. The frame 13 is supported by an adjustable tow-wheel 16. The frame 13 supports a stand-alone hydraulic reservoir 14 that is in communication with the hydraulic pump 12. An articulated boom 18 extends outwardly from the tractor T and support frame 13. A hydraulic motor 24 in communication with the hydraulic pump 12 is positioned on a support plate 26 at the distal end 17 of the boom 18. A drive shaft 19 (see FIG. 3) projecting from the hydraulic motor 24 extends through the support plate 26 and thereby attaches a rotary cultivating head 20 to the hydraulic motor 24.

The hydraulic system and the controls of the device 10 are generally well known in the art. The hydraulic system raises, lowers, extends, and retracts the hydraulic boom 18. The hydraulic system also tilts and angles the cultivating head 20 and otherwise manipulates the cultivating head 20 through a full range of motions by means that are well known in the art. In alternative embodiments the device 10 may be powered electrically, pneumatically, with an independent power unit (such as a gasoline engine), or by any other means known in the art.

Figure 2:
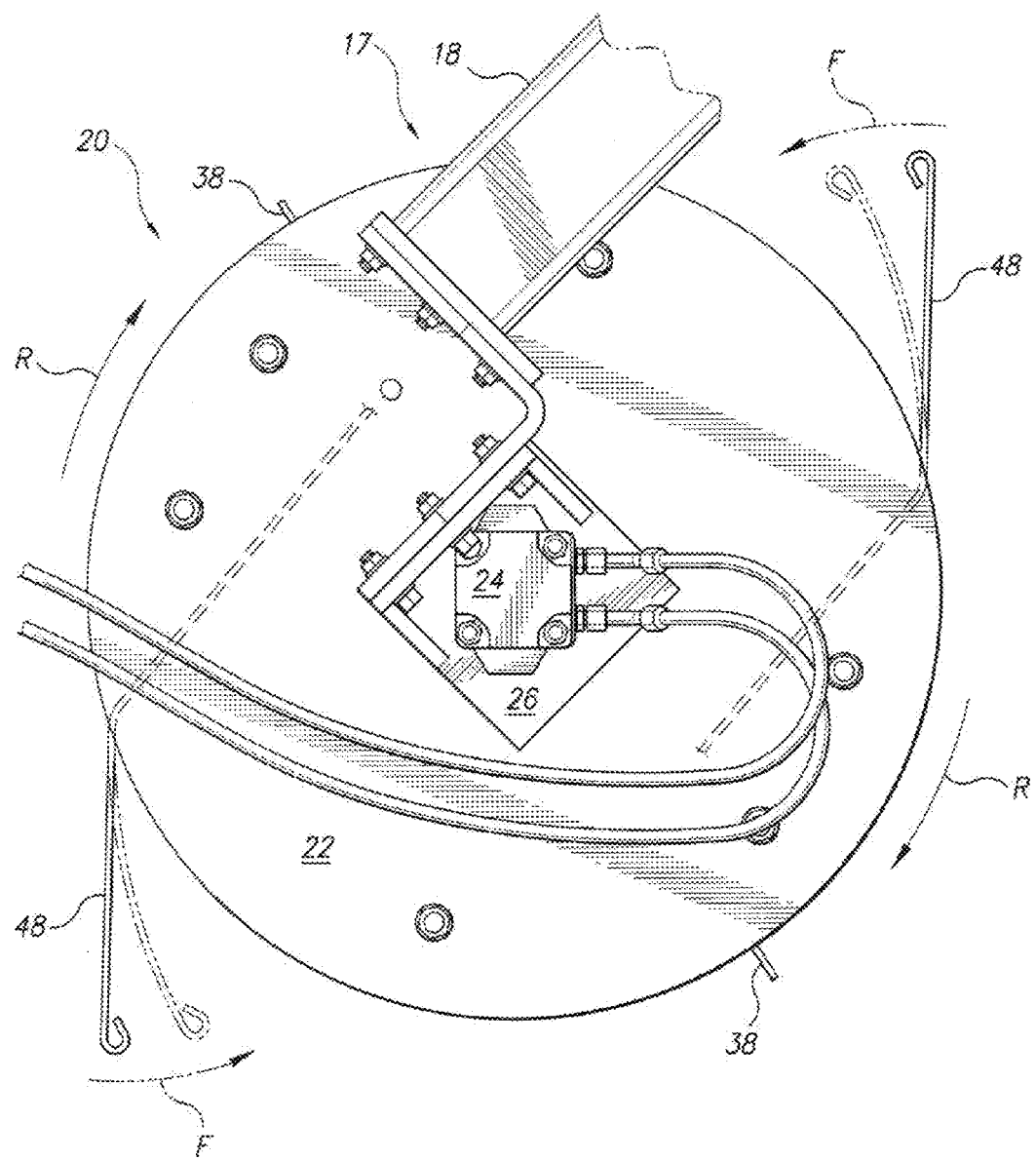
FIG. 2 is a top plan view of the cultivating head.
Figure 3:
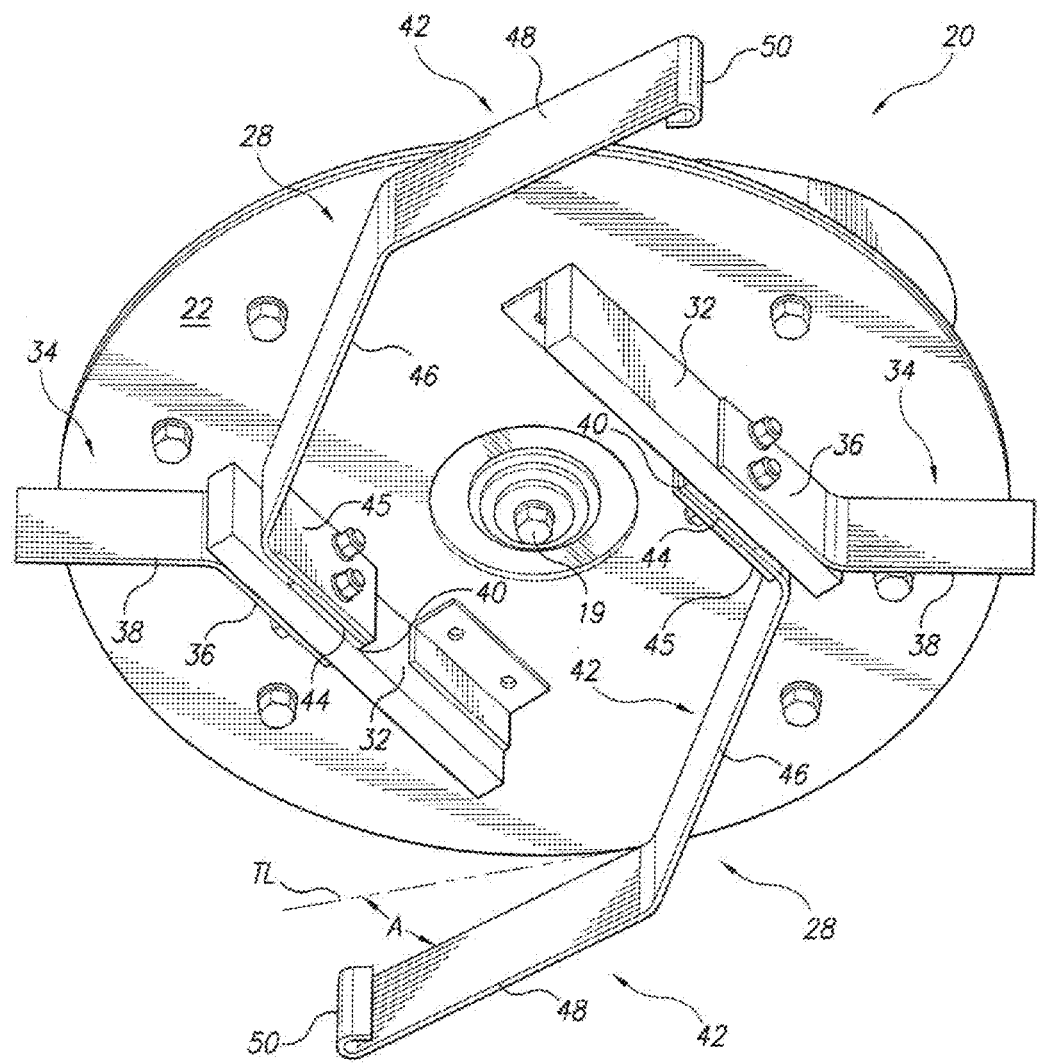
FIG. 3 is a bottom perspective view of the cultivating head.

FIGS. 2 and 3 show the cultivating head 20 in greater detail. Specifically, FIG. 2 shows a top plan view of the cultivating head 20 in the normal operating position. FIG. 3 shows an inverted (relative to the normal operating position) view of the head 20 so that the configuration of the downwardly oriented side of the cultivating head 20 is clearly visible. As best shown in FIGS. 2 and 3, the cultivating head 20 is comprised of a disk 22 that is rotated by the hydraulic motor 24. As best shown in FIG. 3, two essentially identical blade assemblies 28 are fixedly attached to the rotary disk 22. The blade assemblies 28 are connected to the downwardly oriented face of the disk 22 equidistant from the center of the disk 22.

As best shown in FIG. 3, each blade assembly 28 comprises a center member 32, a short blade 34, a spacer 40, a long blade 42, and a long blade support plate 45. In the preferred embodiment, the center member 32 is welded to the disk 22 and the short blade 34, spacer 40, and long blade 42, and long blade support plate 45 are bolted to the center member 32. In normal operating position, the blades 34 and 42 are disposed in an essentially vertical position normal to the ground. In this position, the upper (non-cultivating) edges of the blades 34, 42 are positioned adjacent to the disk 22, and the downwardly oriented (cultivating) edges of the blades 34, 42 are positioned parallel with and adjacent to the soil surface. In operation, the cultivating edges of the blades 34, 42 penetrate the first few inches of the soil and thereby remove the weeds and cultivate the soil.

As best shown in FIG. 3, the center member 32 of each blade assembly 28 provides the primary structural support to the respective assembly 28. In the preferred embodiment, the center member 32 projects from, and extends normal to the disk 22. However, in alternative embodiments, the center member 32 may extend at an angle relative to the surface of the disk 22.

The short blade 34 has a base segment 36 that is bolted to, and parallel with, the center member 32 so that the short blade base segment 36 is effectively rigid and non-elastic. A semi-rigid and elastic short blade extended segment 38 is attached to an end of the short blade base segment 36. In the preferred embodiment, the short blade extended segment 38 angles laterally away from the short blade base segment 36 to the outer periphery of the disk 22. There is a 45° angle between the extended centerline of the short blade base segment 36 and the trajectory of the short blade extended segment 38.

In alternative embodiments, the short blade extended segment 38 may extend straight out from the short blade base segment 36 so that the short blade 34 does not appear segmented. In further alternative embodiments, the short blade extended segment 38 may angle either toward or away from the center member 32 at any angle specified by a user.

The long blade 42 comprises a long blade base segment 44 that is bolted to, and parallel with, the center member 32 so that the long blade base segment 44 is effectively rigid and non-elastic. A long blade mid segment 46 is attached to the long blade base segment 44. In the preferred embodiment, the long blade mid segment 46 angles laterally away from the long blade base segment 44 to the outer periphery of the disk 22. There is a 45° angle between the extended centerline of the long blade base segment 44 and the trajectory of the long blade mid segment 46.

As best shown in FIG. 3, at the outer perimeter of the disk 22, the long blade mid segment 46 is connected to a long blade extended segment 48. The long blade extended segment 48 angles laterally away from the long blade mid segment 46 so that the extended segment 48 extends significantly beyond the orbit of the disk 22. The long blade mid 46 and extended 48 blade segments are flexible, elastic, and semi-rigid.

As best shown in FIG. 3, the long blade extended segment 48 extends outside the orbit and periphery of the disk 22 at an angle from the long blade mid segment 46 so that (from a bottom perspective) the trajectory of the long blade extended segment 48 is in a direction of rotation of the rotary disk 22. In the preferred embodiment, the extended segment 48 extends at an angle A of about 30° relative to a line tangent (i.e. a "tangent line" TL) to the periphery of the disk 22. For the purposes of this disclosure, a "disk tangent line" is a line tangent to the outer periphery of the disk 22 at the point where the long blade 42 intersects the periphery of the disk 22.

In an alternative embodiment, the angle A can be varied by inserting wedge-shaped shims of varying thickness between the spacer 40 and the long blade base segment 44 so that the end of the base segment 44 is angled away from the center member 32 and the base segment 44 is no longer parallel with the center member 32. The larger the inserted wedge, the greater the resulting angle A. This modification allows a user to change the angle A without re-bending or replacing the long blade 42. The long blade extended segment 48 (with or without the wedges) may angle away from the long blade mid segment 46 at an angle of 0 to 90 degrees from the tangent line TL.

In additional embodiments, the long blade mid segment 46 may be aligned with the long blade base segment 44 so that the long blade 42 appears to have only two distinct segments. In a further alternative configuration, the long blade 42 may be formed into an uninterrupted arc so that no long blade 42 segments are immediately discernable. The long blade 42 may also be tapered so that the width of the blade 42 at the base segment 44 is greater (wider) than the width at the end of the extended segment 48. In this embodiment, the cultivating (lower) edge of the blade 42 remains flat and parallel with the soil surface, however the (upper) non-cultivating edge of the blade 42 is tapered and angles slightly downwardly toward the end of the extended blade segment 48.

In the preferred embodiment, the distal end of the long blade extended segment 48 is bent into a curving shape to form a rounded end cap 50 so that the end of the blade segment 48 does not damage selected crops. In alternative embodiments, the end cap 50 may comprise a roller component or any other element known in the art consistent with the goal of ensuring that the selected crops are not damaged by the end portion of the long blade extended segment 48.

In the preferred embodiment, the center member 32 has a length of 9 inches, a width of 3¼ inches, and a thickness of ³⁄₁₆ of an inch. The short blade 34 base segment 36 has a length of 4 inches and the short blade extended segment 38 has a length of 5 inches. The spacer 40 is 2¼ inches long, and the long blade support plate 45 is 3 inches long. The long blade base segment 44 is 4 inches long, the long blade mid segment 46 is 11½ inches long. The long blade extended segment 48 is 8½ inches long. At the end of the long blade extended segment 48, the last 1 inch of the blade 42 is curled to form the rounded end cap 50. In the preferred embodiment, the blades 34, 42, the spacer 40, and the long blade support plate 45 have a width of 2 inches and a thickness of approximately ¹⁄₁₆ of an inch. As noted supra, in an alternative embodiment, the width of the long blade 42 may be tapered so that the width of the base segment 44 is 2 inches, and the width of the blade at the end cap 50 is 1⅝ inch.

In the preferred embodiment, the blades 34, 42 are comprised of a spring-type steel material so that the blades are semi-rigid, but are capable of bending, flexing, or otherwise elastically deforming with no apparent damage to the blades 34, 42. However, since the short and long blade base segments 36, 44 are bolted to the center member 32, these segments 36, 44 are effectively rigid and non-elastic. Depending on the nature of the selected plants, the blades 34, 42 can be constructed with varying degrees of rigidity/flexibility so that the force imparted by the blades 34, 42 is appropriate to the selected plants (see the operational description infra). In alternative embodiments, the blades 34, 42 may be comprised of any alloyed, non-alloyed, composite, or non-composite material that enables the blades 34, 42 to effectively cultivate the soil while not damaging the selected plants.

In operation, as best shown in FIG. 2, as the disk 22 rotates in the direction of the arrow R, the blades 34, 42 cultivate the soil. The extended segments 48 of the long blades 42 cultivate the soil beyond the periphery of the disk 22. When a long blade extended segment 48 contacts the base of a selected plant, the segment 48 bends and flexes back towards the disk (i.e. inwardly) in the direction F so that only a predetermined amount of force is applied to the base of the selected plant. Specifically, since the extended blade 42 cultivates the top 1-2 inches of soil, the force imparted by the blade 42 is applied to the top portion of the plant root-ball, and/or the portion of the stalk/trunk just below the soil surface. As the extended portion 48 of the long blade 42 impacts the plant, the spring action of the extended segment 48 also urges the disk 22 away from the point of contact.

For the foregoing reasons, it is clear that the invention provides an innovative cultivating system that may be used to cultivate around a variety of selected plants. The invention may be modified in multiple ways and applied in various technological applications. The current invention may customized as required by a specific operation or application, and the individual components may be modified and defined, as required, to achieve the desired result. Although some of the materials of construction are not specifically described, they may include a variety of compositions consistent with the function of the invention. Such variations are not to be regarded as a departure from the spirit and scope of the invention, and all such modifications as would be obvious to one skilled in the art are intended to be included within the scope of the following claims.

What is claimed is:

1. A rotary cultivating device comprising:
   a rotary base,
   at least one long blade, the long blade having a non-cultivating edge disposed adjacent the rotary base, and a cultivating edge projecting away from the rotary base, the long blade comprising:
   (a) a long blade base segment, the long blade base segment being attached to the rotary base so that the long blade base segment is effectively rigid and non-elastic,
   (b) an elastic long blade mid segment, the long blade mid segment being attached to the long blade base segment, the long blade mid segment extending to a periphery of the rotary base, and
   (c) an elastic long blade extended segment, the long blade extended segment being attached to an end of the long blade mid segment, the long blade extended segment extending beyond the periphery of the rotary base,
   at least one short blade, the short blade comprising an effectively rigid base segment and an elastic semi-rigid short blade extended segment:
   wherein as the rotary base rotates the long blade, the long blade cultivating edge penetrates and cultivates a soil surface so that when the long blade extended segment contacts a fixed object projecting from the soil surface, the long blade extended segment elastically deforms, thereby limiting an amount of force imparted from the long blade extended segment to the object.

2. The rotary cultivating device of claim 1 wherein the long blade extended segment is structured to flex toward the base when the long blade extended segment contacts the object.

3. The rotary cultivating device of claim 2 wherein the rotary base comprises a disk.

4. The rotary cultivating device of claim 3 wherein a trajectory of the long blade extended segment is in the range of 0 to 89 degrees relative to a disk tangent line at a point where the long blade intersects a periphery of the disk.

5. The rotary cultivating device of claim 4 wherein the trajectory of the long blade extended segment is at an angle of 30 degrees relative to the disk tangent line at a point where the long blade intersects a periphery of the disk.

6. The rotary cultivating device of claim 3 wherein there is a 45 degree angle between an extended centerline of the long blade base segment and the trajectory of the long blade mid segment.

7. The rotary cultivating device of claim 3 wherein, the long blade is planar and essentially rectangular so that in a normal operating position, a planar portion of the long blade extends essentially vertically and normal to the disk and normal to the soil surface, the cultivating edge being disposed adjacent the soil surface and the non-cultivating edge being disposed adjacent the disk.

8. The cultivating device of claim 3 further comprising a center member projecting from the disk, the long blade base segment being connected to the center member.

9. The cultivating device of claim 8 further comprising a spacer and a long blade support plate, the spacer and support plate being shorter than the long blade base segment and configured so that the spacer is connected to the center member and the long blade base segment is disposed between the spacer and the support plate.

10. The cultivating device of claim 8 further comprising a short blade connected to the center member.

11. The cultivating device of claim 10 wherein the short blade extends to a periphery of the base.

12. The cultivating device of claim 1 wherein there is a 45 degree angle between an extended centerline of the short blade base segment and a trajectory of the short blade extended segment.

13. The cultivating device of claim 10 wherein the device comprises at least one blade assembly, the blade assembly comprising the long blade connected to a first side of the center member and the short blade connected to an opposite second side of the center member.

14. The cultivating device of claim 13 wherein two blade assemblies are disposed on the disk.

15. The cultivating device of claim 14 wherein the disk is disposed on a distal end of an articulated boom.

16. The cultivating device of claim 15 wherein the boom is attached to a tractor.

17. A method of making a rotary cultivating device, the method comprising the steps of:
   providing a rotary base,
   attaching a center member to the rotary base, the center member having a proximal side facing a center of the base, and a distal side facing a periphery of the base,
   connecting a short blade to the distal side of the center member, the short blade extending to a periphery of the base, the short blade comprising an effectively rigid base segment and an elastic semi-rigid short blade extended segment;
   connecting an elastic long blade to the proximal side of the center member, a long blade extended segment extending beyond the periphery of the base,
   creating at least a first bend in the long blade so that the long blade bends away from the center member, the long blade being structured so that the long blade extended segment flexes towards the periphery of the base when the long blade extended segment contacts a fixed object.

* * * * *